Aug. 22, 1950 W. L. KUBIE ET AL 2,519,481
TEMPERATURE CONTROL OF CHEMICAL REACTIONS
Filed May 2, 1945 4 Sheets-Sheet 2

INVENTORS
William L. Kubie and
Morris Mattikow
BY Bacon & Thomas
ATTORNEYS

INVENTORS
William L. Kubie and
Morris Mattikow
BY Bacon & Thomas
ATTORNEYS

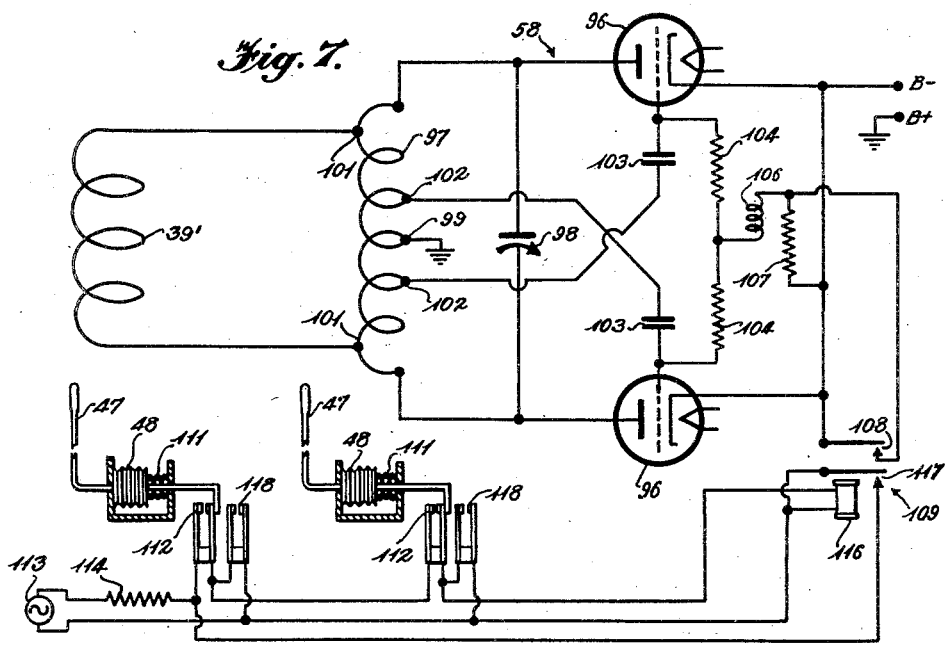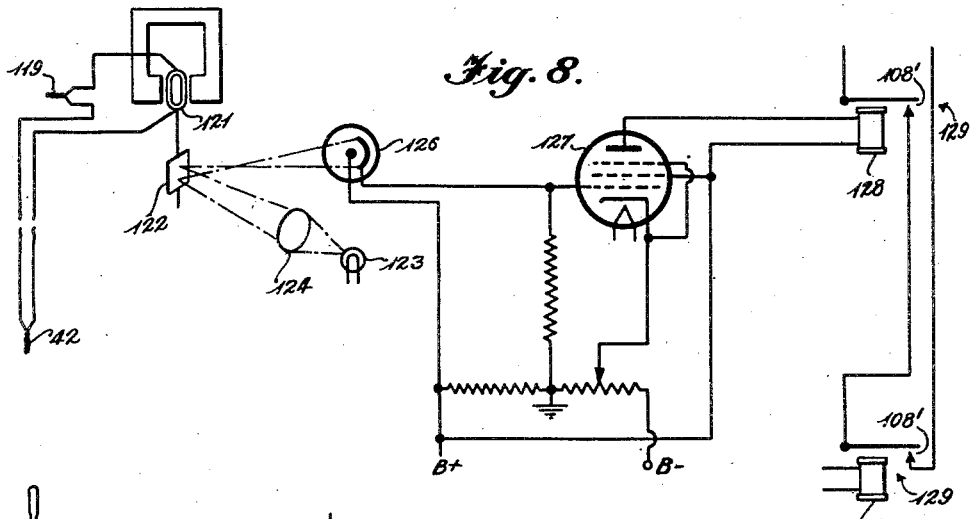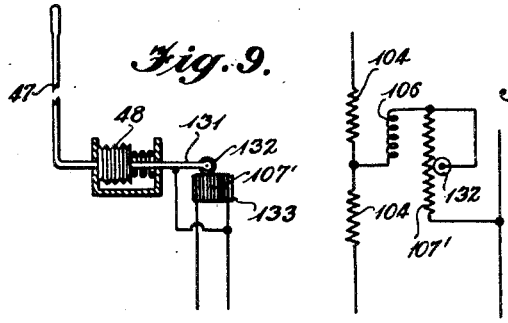

Patented Aug. 22, 1950

2,519,481

UNITED STATES PATENT OFFICE 2,519,481

TEMPERATURE CONTROL OF CHEMICAL REACTIONS

William L. Kubie, Dumont, N. J., and Morris Mattikow, New York, N. Y., assignors, by mesne assignments, to Benjamin Clayton, Houston, Tex., doing business as Refining Unincorporated Application May 2, 1945, Serial No. 591,572

5 Claims. (Cl. 23—1)

This invention relates to temperature control of chemical reactions and more particularly to the employment of induction heating, especially high frequency induction heating, for accurately controlling the temperature in a reaction zone.

The present invention is of particular utility in vapor or gas phase catalytic reactions, especially reactions which are exothermic and in which it is difficult to prevent excessive rises in temperature. The present invention also finds utility with endothermic reactions and the principles thereof may be applied to liquid phase as well as vapor phase reactions irrespective of whether they are catalytically activated. The most difficultly controllable reactions are, however, vapor phase catalytic reactions in which large amounts of heat are liberated as the result of the reaction. The invention will, therefore, be described with particular reference to such reactions.

In accordance with the present invention as applied to exothermic, vapor phase, catalytic reactions, the reaction mixture is, in general, preheated to a temperature somewhat below that at which the reaction is initiated when the reaction mixture is brought in contact with the catalyst. The increment of heat to raise the catalyst and reaction mixture to a reaction temperature is, in general, supplied by high frequency induction heating. In most cases, it is necessary to surround the reaction zone with a cooling medium which rapidly removes heat from the reaction zone and, in general, the present invention contemplates the employment of such a cooling medium in amounts sufficiently great to remove heat from the reaction zone at a greater rate than heat is produced by the reaction. Under these conditions, no substantial reaction would ordinarily take place in the absence of heat supplied by induction heating. By supplying sufficient heat by induction heating to start the reaction and then discontinuing or lowering the production of heat in the reaction zone by the induction heating action when the temperature therein starts to rise above the desired temperature, an extremely sensitive and effective control of the temperature in the reaction zone can be produced.

It is therefore an object of the invention to provide an improved method and apparatus of controlling the temperature of chemical reactions.

Another object of the invention is to provide a process and apparatus for controlling the temperature in chemical reactions in which an increment of heat sufficient to control the temperature in the reaction zone is applied by induction heating and the amount of heat, thus supplied, controlled to provide a substantially constant temperature in the reaction zone.

Another object of the invention is to provide a method and apparatus for controlling the temperature of reactions in which an increment of heat sufficient to raise the temperature of a reaction mixture to the desired reaction temperature is developed by induction heating in a divided material in intimate contact with the reaction mixture and this increment of heat is controlled to maintain the reaction temperature substantially constant.

Another object of the invention is to provide a method and apparatus for controlling the temperature of catalytic reactions in which heat is developed in the catalyst itself by induction heating and controlled to maintain a substantially uniform temperature.

Another object of the invention is to provide a method and apparatus for controlling the temperature of an exothermic reaction in which heat is abstracted from the reaction zone at a greater rate than produced by the reaction and an increment of heat is produced in the reaction zone by induction heating and controlled to maintain the temperature of the reactants substantially constant.

A further object of the invention is to provide a method and apparatus for controlling the temperature of exothermic reactions in the presence of a catalyst in which heat is abstracted from the catalyst at a rate greater than that at which heat is produced by said reaction and a controlled amount of heat is produced in the catalyst by induction heating to maintain the temperature of the catalyst substantially constant at a desired reaction temperature.

A still further object of the invention is to provide a method and apparatus of controlling the temperature of reactions in which a relatively small portion of the heat necessary to bring the reactants to a desired reaction temperature is supplied and controlled by high frequency induction heating, the remainder of such heat being supplied by preheating the reactants.

Other objects and advantages of the invention will appear in the following description of preferred embodiments of the invention shown in the attached drawings, in which:

Figure 7 is a schematic diagram of a high frequency generator and control system therefor;

Figure 8 is a view similar to Figure 7 showing a modified control system for the generator of Figure 7;

Figure 9 is a fragmentary view showing a modification of a portion of the control system of Figure 7; and Figure 10 is a schematic diagram of a portion of the control system of Figure 9.

Figure 2:
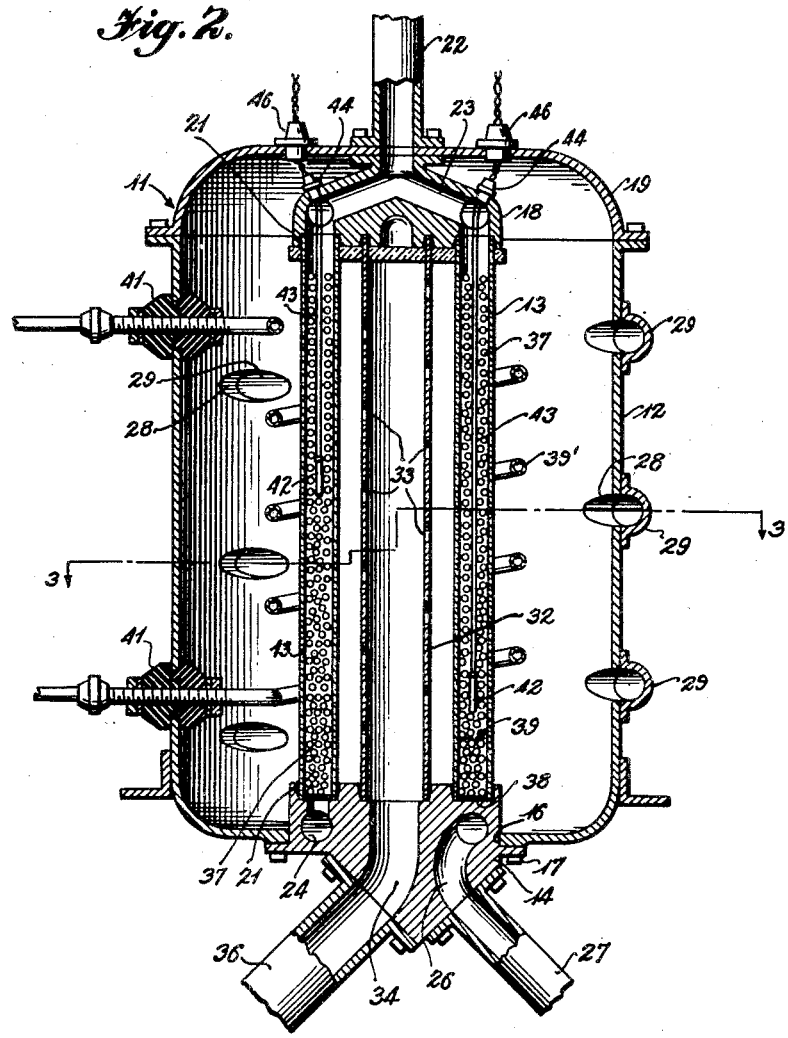
Figure 2 is a vertical cross section through a suitable reaction chamber.
Figure 3:
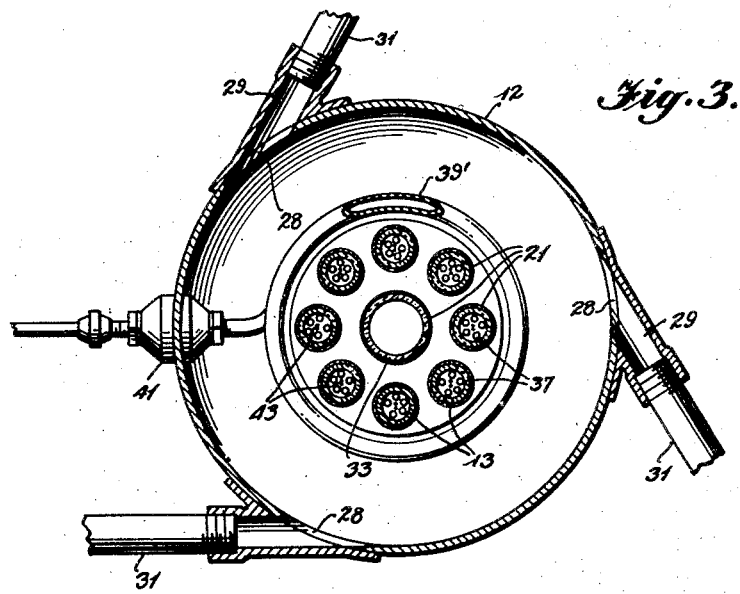
Figure 3 is a horizontal section taken on the line 3—3 of Figure 2.

Referring to Figures 2 and 3 of the drawings, a reaction chamber in accordance with the present invention may include an external pressure-tight casing 12 which may be of any suitable material such as iron or steel. The reaction chamber of Figures 2 and 3 has a plurality of thin-walled ceramic tubes 13 supported in a lower header member 14 secured in an aperture 16 of the casing 12 by any suitable means such as the bolts 17. The tubes 13 may also have their upper ends secured in an upper header member 18 also suitably secured to a cover member 19 for the casing 12. The ceramic tubes 13, as shown in Figure 3, preferably have an annular disposition.

The ends of the tubes 13 preferably make gas-tight connections with the headers 14 and 18, any suitable high temperature cement indicated at 21 being employed, if required. A reaction mixture of gases may enter the upper header 18 through a pipe 22 secured to the casing cover 19 and communicating with a plurality of passages 23 in turn communicating with the interior of the tubes 13. The reaction mixture may be discharged from the tubes 13 through an annular passageway 24 in the lower header 14 which communicates with the lower ends of the tubes 13 and discharges through passageway 26 communicating with a discharge pipe 27.

Provision is made for introducing a cooling agent such as a cooling gas through a plurality of inlet apertures 28 spaced around the periphery of the casing 12 as shown in Figures 2 and 3. These inlet apertures are preferably connected with the tangential inlet members 29 in turn connected with inlet pipes 31 so that a cooling gas may be introduced tangentially into the casing 12 at a plurality of points. The tangential introduction of the cooling gases causes the cooling gases to swirl about the ceramic tubes 13 and provides for effective heat transfer through the tubes 13 to the cooling gases. The cooling gases are preferably exhausted from the reaction chamber through a ceramic tube 32 provided with a plurality of apertures 33 spaced along its length, the tube 32 communicating at its lower end with a passage 34 in the lower header 14 in turn communicating with an exhaust pipe 36.

The ceramic tubes 13 are preferably filled with pellets or porous fragments of an electrically conducting material indicated at 37. Such conducting material will ordinarily be a catalyst or catalyst carrier although for reactions where no catalysts are required, this conducting material may be inert in the particular reaction being carried on. This conducting material may ordinarily extend to the lower portions of the tubes 13 and be supported upon foraminous plates 38 although in some instances it may be desirable to fill the tubes up to approximately the level indicated by the numeral 38 with particles or pellets of an inert material which is not electrically conducting. In order to produce the heat directly in the conducting material 37, the tubes 13 may be surrounded by an induction coil 39' having its terminals extending through the casing 12 and supported therein by suitable pressure-tight insulators 41, the insulators 41 also supporting the coil 39'. The coil 39' will ordinarily be constructed of a tube of metal having high electrical conductivity, for example, copper, cooling medium being circulated through the tube to prevent undue rise in temperature thereof due to heavy electrical currents circulating in the tube.

In order to be able to determine the temperature of the reaction in the tubes 13, thermocouples 42 may be positioned in the tubes to extend substantially axially thereof. The conductors 43 forming leads for the thermocouples 42 may extend axially of the tubes and through suitable insulating plugs 44 in the header 18. These conductors may then extend through suitable insulating plugs 46 in the cover 19 of the casing 12 so as to provide external connections to the thermocouples 42.

It will be appreciated that the thermocouples 42 and their leads must be of conducting material and that they are positioned within the field produced by the induction heating coil 39'. By coating the thermocouples and their leads with a relatively thin coating of a ceramic material capable of withstanding the temperatures produced in the reaction zone and making the thermocouples of metal having high electrical conductivity as compared to the electrical conductivity of the conducting material 37, the thermocouples 42, being in good heat exchange relation with the material 37, will remain at substantially the temperature of the conducting material 37. Thermocouples are available on the market in which the metals of the couple have high electrical conductivities. If the conducting material 37 is of a material such as sponge iron having electrical conductivity much lower than that of the metals of the thermocouples, very little heat is generated within the thermocouples 42 and their leads 43 particularly when the thermocouples and their leads extend axially of the induction heating coil 39'. The thermocouples thus accurately reflect the temperature of the material 37 and the reaction mixture in contact therewith.

Figure 4:
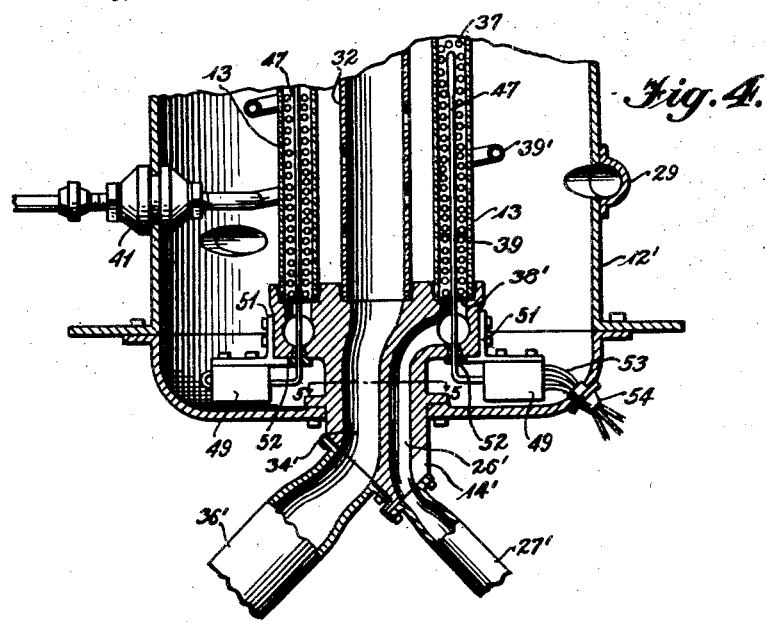
Figure 4 is a fragmentary vertical section through a modified type of reaction chamber.
Figure 5:
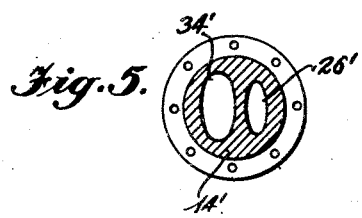
Figure 5 is a horizontal section taken on the line 5—5 of Figure 4.

In Figure 4, a reaction chamber is shown which has its lower end modified to adapt the reaction chamber for the use of temperature responsive devices which have no electrical conductivity but which is otherwise similar to the reaction chamber of Figure 2. Thus, the reaction chamber of Figure 4 is provided with a casing 12' having tangential cooling gas inlet members 29. The reaction chamber may also include the ceramic reaction tubes 13 filled with an electrically conducting material 37 and an inner cooling gas discharge tube 32. Lower header 14' is similar to the header 14 of Figure 2 except that the discharge passageways 26' and 34' have been compressed as shown in Figure 5 to provide clearance for the insertion of heat resisting glass or ceramic tubes 47 forming electrical non-conductive temperature responsive means.

The tubes 47 may be filled with a heat resisting liquid boiling at substantially the temperature desired in the reaction tubes 13 and may have their lower ends terminating in a bellows 48 shown in Figure 7. Further details of such temperature responsive devices will be given below, it being sufficient to state at the present that the bellows 48 may be positioned within control boxes 49 suitably secured to the header 14' by means of brackets 51. The control boxes and bellows are thus positioned within the casing 12' in which the pressure is maintained substantially the same as in the tubes 13 so that the boiling point of the temperature responsive liquid at the pressure in the casing 12' is the controlling factor although the tubes 47 may be sealed to metal tubes (not shown), which metal tubes may extend through the casing 12' to a control bellows 47 (Figure 7) positioned exteriorly of the casing, so that the boiling point of the temperature responsive liquid at atmospheric pressure becomes the controlling factor. The tubes 47 extend through an aperture in the perforated plate 38' at the lower end of the tubes 13 and through plugs 52 sealing apertures through the walls of the header 14'. The tubes 47 are preferably cemented within the plugs 52 with any suitable heat resisting cement forming a substantially leak-proof seal and the plugs 52 seal the apertures through the walls of the header. Suitable electrical conductors 53 may extend from the control boxes 49 through an insulating pressure-tight plug 54 in the exterior casing 12'. The header 14' may connect with suitable discharge pipes 27' and 36' for the reacted mixture and cooling gases, respectively.

The reaction tubes 13 are preferably of a ceramic material which will withstand the reaction temperatures necessary for a particular reaction. They may be of relatively thin-walled structure as the invention contemplates the employment of a very small pressure differential between the interior of the tubes 13 and the exterior thereof. In other words, the casing 12 of Figure 2 or 12' of Figure 4 is a pressure casing in which the cooling gases are maintained substantially at the pressure of the reaction mixture in the reaction tubes 13 and preferably at a slightly greater pressure than the pressure on the interior of the tubes 13. Under these conditions slight inaccuracies in the joints between the ends of the ceramic tubes 13 and the headers 14 and 18 are not fatal as any leaks at these points will merely result in slight dilution of the reacting gases with the cooling gases because of the small pressure differential between the interior and exterior of the reaction tubes 13. Furthermore, the reaction tubes 13 are not required to withstand high differential between their interior and exterior. By using cooling gases which are inert or which are of the same nature as the reaction gases, slight leaks into the interior of the tubes 13 will not materially affect the reaction.

Figure 6:
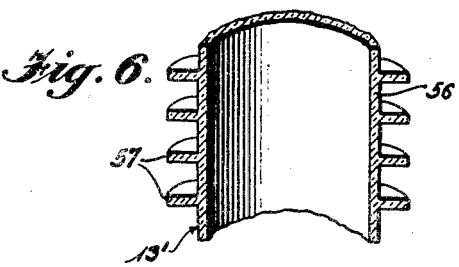
Figure 6 is a fragmentary vertical section through a modified type of reaction tube useable in the apparatus of Figures 2 to 5, inclusive.

A modified type of reaction tube 13' is shown in Figure 6. The tube of Figure 6 may be used in the apparatus of Figures 2 to 4, inclusive, and are the preferred type of reaction tube. These tubes may have relatively thin side walls 56 provided with annular fins 57. The annular fins 57 support the side walls 56 of the tubes and also provide increased heat dissipating area for contact with the cooling gases surrounding the tubes. By employing pellets or fragments of relatively high heat conducting material 37 in the interior of the reaction tubes and making these tubes of thin-walled ceramic material, heat can be rapidly dissipated from the interior of the reaction tubes to the cooling gases surrounding the same.

Figure 1:
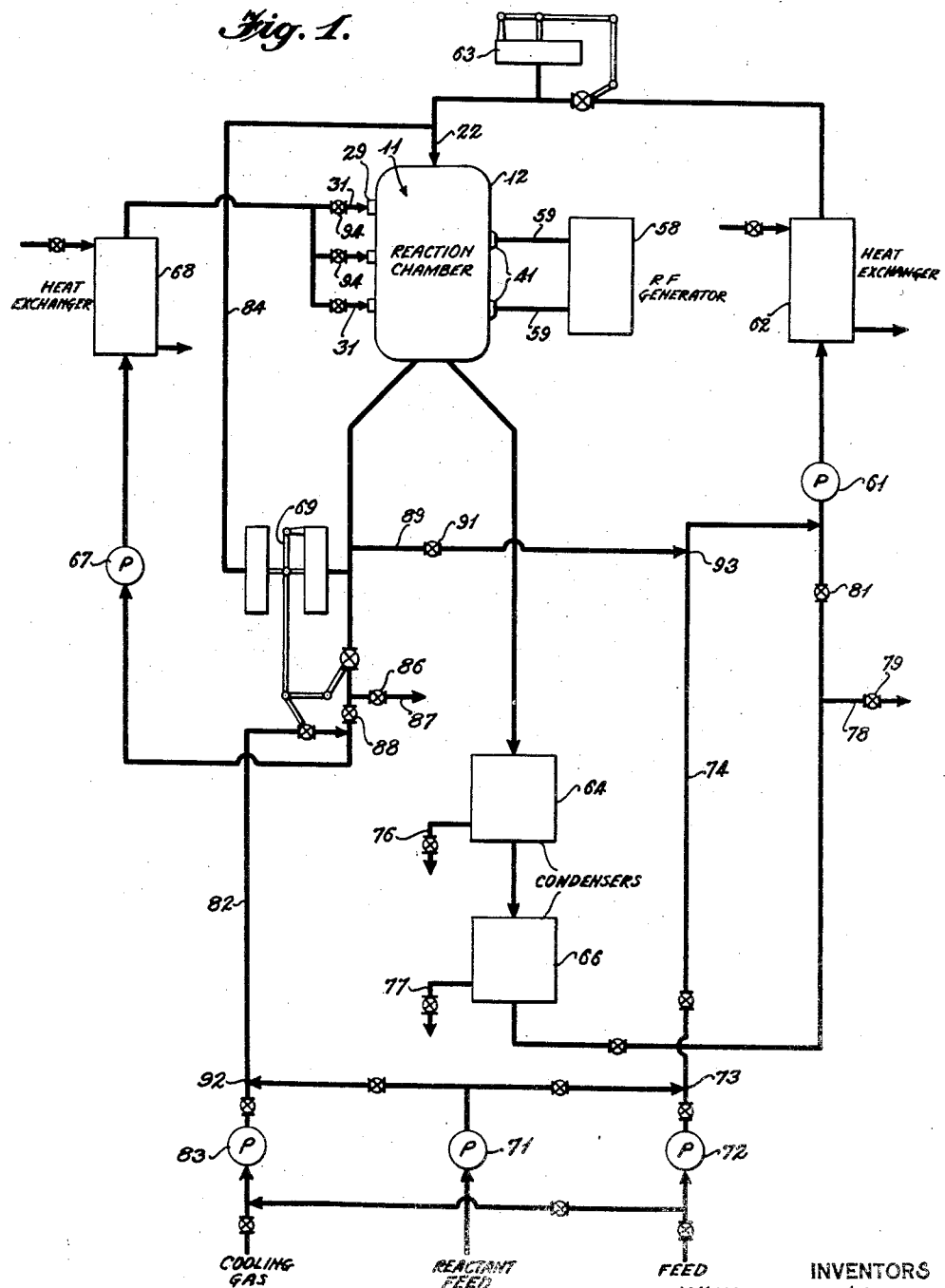
Figure 1 is a schematic diagram of a system suitable for carrying out the present invention.

A suitable system for carrying out gas or vapor phase chemical reactions, particularly catalytic reactions, is shown in Figure 1. In this figure, the reaction chamber 11 is shown as having an inlet connection 22 for reaction gases and an outlet connection 27 for reacted gases. The reaction chamber is also provided with a plurality of inlets 29 for cooling gases and an outlet 36 for cooling gases. A radio frequency generator 58 is also shown as being connected to the reaction chamber, conductors 59 from the radio frequency generator 58 passing through the insulators 41 in the casing 12 of the reaction chamber. The system of Figure 1 is shown as having a circulating system for reaction gases including a pump 61, a heat exchanger 62, pressure regulator 63, reaction chamber 11 and condensers 64 and 66. This system also includes a circulating system for cooling gases including a pump 67, a heat exchanger 68, reaction chamber 11 and balance pressure regulator 69.

In a preferred operation, the reacting gases are introduced into the reaction chamber 11 through the conduit 22 under control of a pressure regulator shown diagrammatically at 63. These gases are heated in the heat exchanger 62 to a temperature just below that at which appreciable reaction takes place in the reaction chamber 11. Such reaction gases will ordinarily comprise a mixture of vapors or gases to be reacted together and this mixture of gases may be introduced into the system by means of proportioning pumps 71 and 72, the gases being mixed at the point 73 and delivered through a pipe 74 to the inlet of the pressure pump 61. After being heated in the heat exchanger and passing through the reaction chamber, the reacted gases may pass through the condensers 64 and 66 in which any reaction products may be condensed and discharged from the system through the pipes 76 and 77, respectively. In certain reactions where liquid or solid materials are vaporized prior to reaction, residual unreacted material may be condensed in one of the condensers 64 or 66 and removed therefrom for reintroduction into the process. If the original reactants are not condensed in the condenser 64 or 66, the residual or unreacted material may be discharged from the system through the pipe 78 by opening the valve 79 therein and closing the valve 81. All or any desired portion of the unreacted material may, however, be recycled through the reaction system by opening or partially opening the valve 81 and closing or partially closing the valve 79. It will be understood that, if desired, any unreacted material leaving the system through the pipe 78 may be delivered to the feed of another system such as shown in Figure 1 so that further reaction can be carried on in a subsequent reaction chamber.

The cooling gases may be the same as the reaction gases or may be entirely distinct in character from the gases undergoing reaction. The entire cooling system will ordinarily be maintained under pressure and any necessary make-up gases may be introduced into the system through a pipe 82 by means of a pump 83. The outlet pressure of the cooling gases from the reaction chamber 11 may be controlled by the balanced pressure regulator 69 which balances the outlet pressure of the cooling gases against the inlet pressure of the reaction gases, a pipe 84 connecting the pressure regulator 69 to the inlet pipe 22 for the reaction gases. The pressure regulator 69 may set both the outlet pressure of the cooling gases in the pipe 36 and control the introduction of make-up gases through the pipe 82 as diagrammatically shown in Figure 1. Ordinarily the cooling gases will be reciruited in the cooling system by the pump 67 but, if desired, a once-through operation of the cooling gases may be employed by opening a valve 86 in an exhaust pipe 87 and closing a valve 88 in the pipe 36.

In many cases, it is advantageous to first employ one or more of the reaction gases in the cooling system and then feed such gases to the reaction-circuit. For example, the cooling gas may be one of the reaction gases, in which case this gas is continuously supplied to the cooling system through the pipe 82 and circulated by the pump 67 through the heat exchanger 68 which will ordinarily be used as a cooler and then through the casing of the reaction chamber. A desired portion of this gas will then be delivered through a pipe 89 into the pipe 74 and thence to the inlet of the pump 61 by partially opening a valve 91 in the pipe 89. This has the advantage that any leakage from the cooling system into the reaction system in the reaction chamber 11 will not contaminate the reaction gases and also heat absorbed by the gas in the cooling chamber of the reaction chamber 11 is utilized to heat gas entering the reaction system. It will, of course, be understood that conventional heat exchange practice can be followed any place in the system. In the latter type of operation where reaction gases are first utilized in the cooling system, the pumps 83 and 71 can comprise proportioning pumps for the reaction gases, mixing occurring at the point 92 or alternately, a single reaction gas can first be sent through the cooling system, mixing of the two reactants occurring at point 93 adjacent the inlet of the pump 61. In any of the above types of operation, the balanced pressure regulator 69 maintains the outlet pressure of the cooling gases in the pipe 36 at least as great as the inlet pressure of the reacting gases in the pipe 22 so that the ceramic tubes 13 in the reaction chamber are never required to sustain an internal pressure greater than the external pressure thereon and the pressure differential between the exterior and interior of these tubes is always small. In general, the amount of cooling gases circulated through the reaction chamber will usually be much greater than the amount of reaction gases passed therethrough so that rapid removal of heat from the reaction is obtained.

By adjusting the valves 94 in the pipes 31 forming the inlets for the cooling gas, substantially uniform cooling throughout the depth of the catalyst or other heat conducting material in the tubes 13 can be obtained as indicated by temperature responsive means such as the thermocouples 42 of Figure 2 or the liquid containing tubes 47 of Figure 4. In this connection, it is usually desirable to space the temperature responsive means in the various tubes at different levels so that the distribution of the cooling gases can be varied to maintain a substantially uniform temperature throughout the reaction chamber or any desired temperature gradient.

Figure 7 illustrates a control system for the high frequency generator 58. This generator may be of any known or suitable type, a conventional push-pull Hartley oscillator circuit being shown as including a pair of high vacuum power tubes 96, an inductance 97 and a tuning condenser 98, the center of the inductance 97 being connected to ground at 99. The heating coil 39' for the reaction chamber may be connected across spaced taps 101 on the tank inductance 97. As is conventional in high frequency heating apparatus, provision may be made for circulating a coolant through the heating coil 39' and inductance 97 as well as the conductors to the condenser 98 by means not shown. The grids of the tubes 96 may be connected to suitable taps 102 on the inductance 97 through blocking condensers 103 and may be connected to the cathode circuit of the tubes through bias resistors 104, a common radio frequency choke 106 and a common cut-off bias resistor 107. Short circuiting of the cut-off bias resistor 107 enables operation of the oscillator circuit 96 to generate high frequency power and cause large currents to flow through the heating coil 39'. This short circuiting may be accomplished through contacts 108 of control relay 109. It will be understood that opening of contacts 108 will prevent operation of the oscillator circuit 58 and closing of these contacts will cause immediate generation of alternating current power in such circuit.

Figure 7 illustrates control of the oscillator circuit by means of liquid filled temperature responsive tubes 47. At temperatures lower than that desired, the bellows 48 attached to such tubes will be contracted by means of the springs 111 to close spring contacts 112 associated therewith to close a circuit from a source 113 through resistor 114, all of contacts 112 in series, and operating coil 116 of relay 109. Closing of all of contacts 112 will thus close relay contacts 108 to initiate operation of the oscillator circuit 58. The relay 116 may be provided with a holding circuit including normally open contacts 117 connected in parallel with all of the contacts 112 so that a circuit is completed through the operating coil 116 of relay 109 even though certain of the contacts 112 may subsequently open. When any one of the temperature responsive devices 47 is subjected to a predetermined elevated temperature, expansion of its bellows 48 will close contacts 118 associated therewith to short circuit the operating coil 116 of relay 109 to cause opening of contacts 108 and discontinue operation of the oscillator circuit. Resistor 114 prevents short circuiting of the source 113. It will be apparent from the above description of the control device of Figure 7 that a predetermined elevated temperature in any one of the reaction tubes 13 of Figure 4 will prevent operation of the generator 58 and that the temperature in all of these reaction tubes must fall to a predetermined lower temperature so as to close all of contacts 112 before the generator 58 is again placed in operation. The contacts 112 and 118 may be adjusted to operate over a very narrow temperature range so that a substantially constant temperature is maintained in the reaction tubes. Operation of the temperature responsive device may be employed as a guide in initially adjusting the introduction of cooling gases into the reaction chamber 11.

Figure 8 illustrates a control system which may be employed with the thermocouples of Figure 2. These thermocouples may have their hot junction 42 positioned in the tubes 13 and their cold junction 119 positioned externally of the reaction chamber, the hot junction and cold junction being connected in series with a galvanometer coil 121. The galvanometer coil 121 may be mounted upon a common axis with a mirror 122 against which a beam of light from a source 123 is directed by a lens 124, the reflected beam of light impinging upon the cathode of a photocell 126 in one position of the mirror 122. In the circuit shown, light is removed from the photocell 126 when a predetermined maximum temperature causes sufficient current to flow in the galvanometer coil 121 to swing the mirror 122 from the position shown. A conventional amplifier circuit including a high vacuum tube 127 may be employed to energize the operating coil 128 of a relay 129 having normally open contacts 108' connected across the cut-off bias resistor 107 of Figure 7. A plurality of relays 129 having contacts 108' connected in series and operating coils 128 connected to amplifying and photocell circuits individual to each of the thermocouples in the various tubes 13 of Figure 2 may be employed as indicated in Figure 8. It will be apparent that impingement of sufficient light on any photocell 126 to operate the associated relay 128 will cause operation of generator 58 of Figure 7. A predetermined maximum temperature in any of the reaction tubes 13 of Figure 2 will cause light to be removed from its associated photocell 126 to cause opening of contacts 108' of its associated relay 129. Thus, the generator 58 can not operate until the temperature in all of the reaction tubes is sufficiently low to cause closing of all of the relays 129. Thus, the generator can not operate unless all of the photocell circuits are operating and their associated relays closed by reason of light impingement upon the photocells 126. The predetermined maximum temperatures may be varied by varying the position of the photocells 126 and their associated light sources 123 with respect to each other.

Instead of employing circuits in which the generator 58 of Figure 7 is either operated at its maximum power or the operation thereof discontinued, a graduated control of the power of the oscillator circuit 58 may be employed in Figures 9 and 10. For example, the temperature responsive means 47 of Figure 7 and associated bellows 48 may be employed to vary the resistance of a cut-off bias resistor 107'. One way of accomplishing this is to provide the movable end of the bellows 48 with a member 131 having a roller 132 journaled therein and forming a movable contact for the resistor 107'. The resistor 107' may be wound upon an insulator member 133 positioned at an angle to the path of travel of the roller 132. A partial schematic circuit for this arrangement is shown in Figure 10, this figure also showing the radio frequency choke 106 and bias resistors 104 of Figure 7 to illustrate the position of the resistor 107' in the circuit of Figure 7. It will be apparent that movement of the roller 132 to the right in Figure 9 or upwardly in Figure 10 will increase the D. C. resistance in the grid circuits of the tubes 96 of Figure 7 so as to increase the bias on these tubes and decrease the power generated thereby. It is further apparent that similar circuits may easily be arranged to operate from the photocell amplifying circuit of Figure 8.

The present invention is applicable to substantially all liquid phase or gas phase reactions in which temperature control is important. It is also applicable to reactions in which one of the reactants is a gas admixed with or suspended in a liquid or one of the reactants in a finely divided solid suspended in a liquid or gas. Thus the invention may be applied to the disassociation, cracking or polymerization of a single material or of a mixture of materials or reactions between different materials. It is preferred to flow the reactant or reaction mixture through a stationary bed of electrical conducting pellets or particles as this provides a heat ballast in the reaction zone assisting in maintaining a desired temperature but in some cases the electrical conducting particles may be admixed with and be carried by the flowing reactant or reaction mixture through the reaction zone. Where a solid catalyst for a particular reaction is not an electrically conducting material, it may in some cases be admixed in finely divided form with the reactant and flowed through the reaction zone in which electrical conducting pellets or particles are present either as a stationary bed or admixed with the flowing material. The catalyst may, however, be electrically conducting, in which case the catalyst itself may be the substance in which the heat is generated by induction heating. Catalysts of this type may form the conducting particles or pellets in contact with the reactant in the reaction zone. If the catalyst required for the reaction desired is not electrically conducting, it can be deposited upon the surface of conducting particles such as metallic or carbon particles which are inert in the particular reaction being carried on so that the conducting particles function as a carrier for the catalyst. If the particular reaction involved requires no catalyst, the reactant or reaction mixture may be flowed in contact with inert metallic or other conducting particles such as carbon in which heat can be generated by induction heating. The particular reaction chamber illustrated can be employed for liquid reactions and mixed phase reactions as well as for vapor or gas phase reactions and similarly, the cooling medium may be liquid as well as a gas or vapor.

A major advantage of the present invention is that induction heating is, in general, employed for supplying a relatively small increment of the heat necessary to bring the material being reacted to the reaction temperature as the major portion of the heat can be supplied to the reactants prior to entering the reaction zone by any known or conventional heating step. This is particularly advantageous where high frequency induction heating is employed as the conversion of electrical energy into heat energy by high frequency induction heating is relatively expensive.

Since the distribution of the heat energy produced in the reaction tubes depends to a considerable extent upon the conductivity of the conducting particles in the reaction tubes as well as the frequency employed, the appropriate frequency will vary so that no precise range of frequencies can be specified. In general, relatively high frequencies are preferred, i. e., frequencies between approximately 20,000 and 3,000,000 cycles although the invention does not exclude the employment of lower frequencies including power frequencies or even higher frequencies. Also, in general, a somewhat greater amount of heat will be generated in the conducting particles adjacent the tube walls because of partial magnetic shielding of the particles adjacent the center of the reaction tubes by the particles adjacent the tube walls. It is to be noted that this is a favorable condition as the cooling effect is also more efficient with respect to the particles adjacent the tube walls. By balancing the cooling effect of the cooling medium surrounding the tubes against the heating effect of the induction field, for example, by varying the amount and temperature of the cooling medium, and the frequency and intensity of the induction field, a substantially uniform temperature gradient across the tubes may be maintained.

In carrying out exothermic reactions, the temperature of the reacted material discharged from the process will generally be greater than the temperature of the reactant supplied to the input of the process. It will be apparent that, if the temperature of the catalyst or other pellets in the reaction chamber remains substantially constant, the heat in the input material plus the heat of reaction plus the heat supplied through induction heating must equal the heat removed by the cooling medium plus the heat in the discharged reacted material. The heat in the discharged material minus the heat in the input material must equal the heat required to raise the temperature of the materials passing through the process. This is true irrespective of changes in specific heat of the material being treated from any cause. It follows that the heat of reaction plus the heat generated by induction heating must equal the heat removed by cooling plus the heat necessary to raise the temperature of the materials passing through the reaction zone.

For a stable operation, the heat removed by cooling plus the heat required to raise the temperature of the material passing through the process should be substantially greater than the heat of reaction. The greater the cooling effect, the greater the amount of preheating which can be employed. Since the reaction is usually more rapid near the input before the input materials have been diluted with reaction products, the heat of reaction is generally greater near the input end of the reaction zone. A balance can be obtained by varying the cooling effect along the reaction zone, the temperature of preheat and the throughput to produce a substantially uniform temperature or any desired temperature gradient longitudinally of the reaction chamber.

Prior processes have also attempted to control the average temperature in the reaction zone by varying one or more of these factors. Aside from disturbing the balance referred to, the time lag between the application of such a control and its effect upon the reaction temperature has been sufficiently great that it has been necessary to either operate at a temperature much lower than the optimum temperature for the desired reaction or to render the process subject to uncontrollable rises in temperature destructive of any catalyst employed and in any case requiring shutting down of the process. By establishing the balance referred to above at a temperature substantially lower than the desired temperature in the reaction zone and then employing induction heating in accordance with the present invention to substantially instantaneously control the generation of heat throughout the reaction zone, the process can be operated at substantially the optimum temperature for the particular reaction desired. When induction heating is discontinued, the cooling effect is much more rapid than the effect of the heat of reaction, so that the temperature of reaction begins to fall rapidly. As soon as the temperature falls slightly, the induction heating is again applied and the temperature begins to increase. By setting the control for the induction heating apparatus to operate over a small temperature range, the temperature in the reaction zone can be held constant within close limits. The heat capacity of any catalyst or other pellets in the reaction zone assist in this operation as they provide a heat balance to help maintain the temperature constant.

In carrying out endothermic reactions, the material supplied to the reaction zone will, in general, be preheated to a somewhat higher temperature than the desired temperature in the reaction zone. The observations made above as to heat and temperature balances are applicable with the understanding that the heat of reaction is negative. In some instances, no cooling will be required as the temperature of reaction will fall sufficiently rapidly when the induction heating is discontinued that the induction heating control alone will maintain the reaction temperature substantially constant. In order to make the temperature control of the induction heating more effective and provide a more uniform temperature across the reaction zone as discussed above, it is many times desirable to employ some cooling even when carrying out endothermic reactions.

As examples of general types of reactions to which the present invention may be applied, the following may be cited:

(1) Oxidation:
 Naphthalene to phthalic anhydride
 Alcohol to aldehydes
 Alcohol to ketone
 Hydrocarbons to alcohol
 Hydrocarbons to acids
 Ammonia to nitric acid
(2) Hydrogenation:
 Partial hydrogenation
(3) Cyclohexane to adipic or maleic acid
(4) Reduction or nitro groups to amino groups
(5) Chlorination
(6) Catalytic cracking
(7) Hydroforming; hydrofining, isomerization and cyclization
(8) Nitration both liquid and vapor phases The above list is not intended to be complete as many other reactions will occur to those skilled in the art.

As a specific example, naphthalene may be oxidized to phthalic anhydride employing air as the oxidizing agent. A suitable catalyst for this oxidation reaction comprises a vanadium oxide or mixture of vanadium oxides. Since vanadium oxides are not sufficiently electrically conducting to render the employment of induction heating effective, the vanadium oxides may be carried by an inert metal, for example, pellets of sponge iron. The production of such a catalyst forms no part of the present invention but by way of example, sponge iron pellets may be impregnated with a solution of vanadium trioxide dissolved in dilute nitric acid by quickly dipping the pellets and draining them immediately. The impregnated pellets are then heated in air, preferably by induction heating to vaporize the liquids. The catalyst pellets may then be packed in the reaction tubes as shown in the drawings.

A reaction mixture is formed of air and naphthalene vapor and heated to a temperature of approximately 350° C. Cooling gases are then circulated around the reaction tubes as described in detail above and simultaneously sufficient heat is generated in the catalyst by induction heating to raise the temperature to 400° C. The amount and temperature of the cooling gases are adjusted to remove somewhat more heat than is generated by the reaction and the induction heating apparatus thereafter operates intermittently using the off-on control of Figures 7 or 8. As the temperature due to the combined action of the exothermic reaction and the induction field tends to increase above 400° C., induction heating is discontinued or reduced until the cooling medium lowers the reaction temperature to just slightly below 400° C., at which time induction heating is again applied. The induction heating control can, of course, be operated manually, if desired, by employing temperature indicating instruments as a guide. It will be apparent that the amount and temperature of the cooling gases should be adjusted so that somewhat more heat is removed from the reaction zone thereby than is generated by the reaction, while the induction heating apparatus, during operation, supplies sufficient heat to override the action of the cooling gases. Thus, for example, 90% of the heat, other than the heat of reaction, can be supplied by preheating, the remaining 10% being supplied by induction heating at a frequency, for example, of one megacycle. By actually supplying an amount of heat equal to 20% during its operating periods, the induction heating apparatus will cause overheating. The cooling effect can then be adjusted to remove all of the heat of reaction plus an amount of heat equal to ½ of that supplied by induction heating during application thereof. Under these conditions, the induction heating apparatus operates approximately one half of the time and varies its time of operation to compensate for unavoidable variations of other factors. Also, under these conditions, the system is stable and the induction heating apparatus will operate to maintain the temperature substantially constant even though unavoidable fluctuations in rate of throughput, temperature of preheat, amount and temperature of cooling medium, etc., occur. By adjusting the induction heating control to operate over a very narrow temperature range, the temperature in the reaction zone may be maintained constant within an extremely small temperature range.

A suitable reaction mixture for oxidizing naphthalene is approximately .2% moles of naphthalene per mole of air. This mixture is not explosive and may be rapidly passed through the reaction tubes to produce a 60 to 90% conversion of naphthalene to phthalic anhydride.

As another example, the present invention can be employed for the synthesis of ammonia by passing a mixture of 3 volumes of hydrogen gas and 1 volume of nitrogen gas over pellets of reduced iron as a catalyst. This reaction is also exothermic and its optimum temperature is approximately 452° C. By attempting to control the temperature by varying the rate of input of the reaction mixture, in the absence of temperature control by induction heating, the temperature of the reaction catalyst varied from 427° to 498° C. within a short period of time. By varying the heat input control substantially instantaneously by changing the intensity of an induction field, the temperature was held substantially constant at 452° C. By maintaining the reaction at approximately 452° C., it was found possible to secure appreciable conversion even at atmospheric pressure although high pressures facilitate the reaction. That is to say, pressures between 70 and 1000 atmospheres are preferred.

It is apparent from the above that an induction heating apparatus having a relatively small capacity, with respect to the total heat demand of a system for carrying on chemical reactions, can be employed to accurately control temperatures in an otherwise difficultly controllable system. By thus maintaining the temperature of reaction substantially constant at the optimum temperature, the life of any catalyst employed is materially lengthened. Excessive temperatures which are usually destructive of catalysts are avoided. Since the temperature can be maintained at substantially the optimum temperature for the reaction, much better conversion is obtained. The input of the reactant or reaction mixture can be held substantially constant since all variables after the initial adjustments are made are taken care of by the induction heating control, resulting in greater capacity of the apparatus or process and controlled constant production. In general, smoother operation is effected as all variables may be maintained substantially constant except the induction heating.

While we have disclosed the preferred embodiments of our invention, it is understood that the details thereof may be varied within the scope of the following claims.

We claim:

1. The method of controlling the temperature of an exothermic chemical reaction in a reaction zone, which comprises, passing a fluid material to be reacted through said zone in intimate contact with solid particles of electrically conductive material, extracting heat from said reaction zone with a cooling medium at a greater rate than heat is generated by said reaction, subjecting said particles in said zone to an alternating magnetic field for generating heat in said particles and varying said alternating magnetic field to control the amount of heat generated in said particles and maintain a desired temperature.

2. The process of controlling the temperature of an exothermic reaction in a reaction zone, which comprises, maintaining a body of a fluid material to be reacted in said reaction zone in intimate contact with particles of an electrically conductive material, preheating the material to be reacted to initiate said reaction, removing heat from said reaction zone with a cooling medium at a greater rate than heat is generated by said reaction, subjecting said particles in said zone to an alternating magnetic field for generating controlled amounts of heat in said particles, and maintaining the temperature of reaction substantially constant at a desired temperature by varying said magnetic field.

3. The method of controlling the temperature of an exothermic catalytic reaction in a reaction zone, which comprises, continuously passing a fluid material to be reacted through said reaction zone in contact with a bed of electrically conductive particles and catalyst for said reaction, preheating said materials to a temperature at which the heat of reaction tends to raise the temperature in said reaction zone above the desired temperature, extracting heat from the reaction zone with a cooling medium in an amount sufficiently great to cause the temperature of reaction to tend to fall below the desired temperature, simultaneously generating heat in said particles by induction heating, and controlling the extent of said induction heating to maintain the temperature of reaction substantially constant.

4. The method of controlling the temperature of an exothermic catalytic reaction in a reaction zone, which comprises, maintaining a body of a material to be reacted in said reaction zone in intimate contact with and distributed throughout a bed of electrically conductive particles and in intimate contact with a catalyst for said reaction, initially heating said materials to a temperature at which the heat of reaction tends to raise the temperature in said reaction zone above the desired temperature, extracting heat from the reaction zone with a cooling medium in an amount sufficiently great to cause the temperature of reaction to tend to fall below the desired temperature, simultaneously generating heat in said particles by induction heating, and controlling the extent of said induction heating to maintain the temperature of reaction substantially constant.

5. The process as defined in claim 4 in which the electrically conductive particles comprise the catalyst for said reaction.

WILLIAM L. KUBIE.
MORRIS MATTIKOW.

REFERENCES CITED

The following references are of record in the file of this patent:

UNITED STATES PATENTS

| Number | Name | Date |
|---|---|---|
| 1,286,135 | Somermeier | Nov. 26, 1918 |
| 1,472,281 | Page | Oct. 30, 1923 |
| 1,597,476 | Page | Aug. 24, 1926 |
| 1,748,706 | Esmarch | Feb. 25, 1930 |
| 2,125,921 | Hillhouse | Aug. 9, 1938 |
| 2,276,643 | Bates | Mar. 17, 1942 |
| 2,430,652 | Smith | Nov. 11, 1947 |

Dedication 2,519,481.—*William L. Kubie*, Dumont, N.J., and *Morris Mattikow*, New York, N.Y. TEMPERATURE CONTROL OF CHEMICAL REACTIONS. Patent dated Aug. 22, 1950. Dedication filed June 30, 1964, by the assignee, *Benjamin Clayton, doing business as Refining, Unincorporated.*

Hereby dedicates to the public the terminal part of the term of said patent effective December 31, 1963.

[*Official Gazette September 29, 1964.*]